Figure 1:
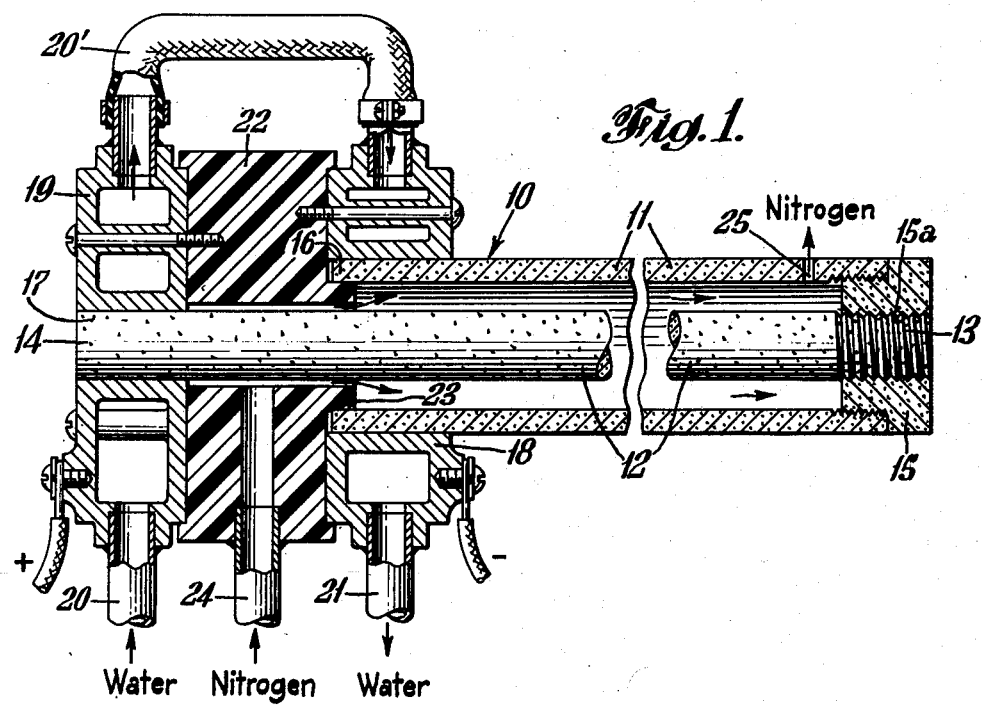

July 26, 1960 R. D. WESTBROOK ET AL 2,946,835
CARBON-CARBON BORON THERMOCOUPLE
Filed Aug. 12, 1957

INVENTORS,
RUSSELL D. WESTBROOK
ROBERT L. SHEPARD
BY Herbert J. Evers
ATTORNEY

United States Patent Office 2,946,835
Patented July 26, 1960

2,946,835

CARBON-CARBON BORON THERMOCOUPLE

Russell D. Westbrook and Robert L. Shepard, Cleveland, Ohio, assignors to Union Carbide Corporation, a corporation of New York Filed Aug. 12, 1957, Ser. No. 677,743

3 Claims. (Cl. 136—5)

This invention relates to thermocouples, and more particularly concerns high temperature thermocouples capable of measuring temperatures above 2000° C.

Most of the conventional thermocouples, particularly thermocouples having one or both elements made of metal, are inherently unsuited for measuring temperatures above 2000° C. This is primarily due to the fact that the upper limits of metal thermocouples are largely determined by the melting point of the metal element in the case where only one of the elements is metallic, or the lower melting metal element where both elements of the thermocouple are metallic. For example, the iron-constantan thermocouple is operative up to about 1000° C., and the platinum-rhodium thermocouple is capable of being used at temperatures up to about 1800° C.

At higher temperatures, thermocouples consisting of high melting, non-metallic elements may be used. Typical examples of non-metallic thermocouples are the carbon-silicon carbide thermocouple described in U.S. Patent No. 2,094,102 and the graphite-boron carbide thermocouple disclosed in U.S. Patent No. 2,152,153. Although these non-metallic thermocouples may satisfactorily fulfill their function in measuring temperatures which are not susceptible of measurement by conventional metallic thermocouples, nevertheless they too are limited to the measurement of temperatures below their fusion or sublimation temperatures. Thus the carbon-silicon carbide thermocouple can only be used up to temperatures of approximately 2200° C. The graphite-boron carbide thermocouple fuses or starts to melt at about 2350° C. For these reasons, the measurement of temperatures of approximately 2000° C. and above by various types and kinds of thermocouples is a difficult problem.

It is, therefore, an important object of the present invention to provide a high temperature thermocouple, which is capable of accurately measuring temperatures above 2000° C.

Figure 2:
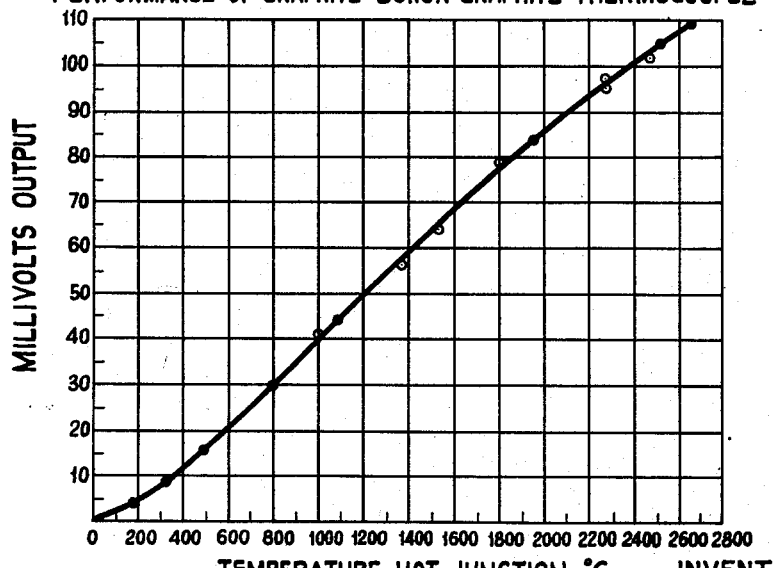

In the drawing:

Fig. 1 is a cross sectional elevational view of a thermocouple illustrating the principles embodying the features of the present invention; and Fig. 2 is a temperature-voltage graph which illustrates the performance of a thermocouple made in accordance with the invention.

According to the present invention, it has been discovered that a most satisfactory high temperature measuring instrument may be obtained from a thermocouple having an element of carbon and a specially prepared element of carbon and boron, referred to hereinafter as a boronated carbon element. The term "carbon" is intended to cover any of the conventional forms of carbon, including graphite, natural or synthetic, which have a hexagonal crystalline structure. By the term "boronated" carbon element is meant a carbon element in which boron is so disposed in the hexagonal graphite lattice structure of the carbon as to alter the thermoelectromotive force from that of a substantially similar carbon element having no boron therein. The hexagonal carbon lattice structure has a random array of boron atoms disposed in isolated positions therein to fill in any "holes" or vacancies in the lattice, or to substitute as replacement atoms for carbon atoms without disturbing the hexagonal lattice of the carbon. In such an arrangement the boron which is a doping impurity of different valency from that of the lattice carbon, is disposed in the lattice structure of the carbon in the ratio of 5 boron atoms to about 100 or more carbon atoms. This is to be distinguished from such structures as the cubic type structure of boron carbide ($B_4C$) which demand 400 boron atoms per 100 carbon atoms.

For brevity, in the following description, reference will only be made to a boronated graphite element, but it is to be understood that it is not intended to limit the scope of the invention to a specific type of crystalline carbon.

A boronated graphite element embodying the principles of the invention may be prepared in the following preferred manner.

A graphite element in the form of a rod or tube of suitable dimensions is impregnated at room temperature with a saturated boric acid solution and placed in a graphite capsule, where it is packed with a mixture of coke and boric acid crystals. The packed capsule is then heated for about an hour to drive off the water of crystallization from the boric acid crystals. The remaining boric oxide in the packing coke later provides a boron-containing atmosphere around the packed graphite element. Following this, the contents of the capsule are baked to a final temperature above the highest temperature at which the thermocouple will be used. For example, if the thermocouple is to be used in measuring temperatures up to 3000° C., the final temperature should be above 3000° C., preferably about 3100° C.

The above treatment results in a doped or boronated graphite rod having therein boron in an amount equal to about 0.01% to 5.0% by weight of the rod. Although the exact disposition of the boron in the graphite element is not entirely understood, as far as can be ascertained, it is believed that, since a boron atom is of approximately the same size as a carbon atom, it is possible that the electrically active boron atoms occupy vacancies or holes on the hexagonal graphite lattice of the carbon.

Illustrated in Fig. 1 is a thermocouple 10 formed of two electrically dissimilar types of carbon, and embodying the principles of the present invention. The thermocouple 10 comprises a hollow cylinder or tube 11 of carbon as one of the elements of the thermocouple, and an inner rod 12 of boronated carbon as the other element. The rod 12 is receivable inside the tube 11, and is provided with a threaded tip 13 at one end thereof and an overhanging portion 14 at the opposite end. The tube 11 is provided with a carbon plug 15 having a threaded opening 15a constructed to receive the threaded tip 13 of the rod 12.

The cold junction 16 and 17 of the carbon element 11 and the rod element 12, respectively, is cooled by the water cooling jacckets 18 and 19, preferably made of copper or brass. The water cooling jackets 18 and 19 are in the form of concentric cylindrical shells, which are press fitted or clamped to their respective thermocouple elements.

Cooling water is first introduced into the jacket 19 by a water inlet pipe 20, and is removed from the jacket 18 by an outlet pipe 21, the jackets communicating with one another by a branch pipe 20' of electrically insulating material. Situated between and adjacent the water jackets, and concentrically disposed with respect to the over-hanging portion 14 of the rod element 12, is a cylindrical dielectric block 22 made of polystyrene resin or other suitable electrical insulating material. The block 22 is provided with a retaining lip 23 for fixedly holding the cold end 16 of the tube element in concentric relation to the rod element 12.

To prevent oxidation of the thermocouple elements, the tube is provided with a reducing or inert atmosphere. For this purpose, an inlet opening 24 is provided in the block 22 for the admission of a reducing or inert gas such as nitrogen or helium into the intervening space between the couple elements. This gas may be removed by an outlet openings 25 in the tube 11 adjacent the hot end thereof.

Thermocouples made in accordance with the invention are admirably suited for high temperature measurements with the unique capability of being operative at temperatures above 2000° C. They show an exceptionally high output of over 100 millivolts (mv.) at 3000° C. A typical calibration curve of mv. output versus temperature of the hot junction (with the cold junction at 20° C.) is shown in Fig. 2. In repeated calibration tests of the same carbon-boronated carbon thermocouple, it has been found the calibration curve of the thermocouple may be substantially reproduced, the calibration points on both heating and cooling cycles showing a maximum deviation of about 20° C. from a mean calibration curve.

In a test run employing the thermocouple of the invention, a temperature of 2550° C. was maintained for 45 minutes. During this period the output electromotive force remained constant, indicating no appreciable changes, physically or chemically, in the characteristics of the thermoelectric junction due to boron migration or other possible causes.

The carbon-boronated carbon thermocouple of the present invention possesses good mechanical strength, and can be readily fabricated from existing forms of carbon, such as stock graphite. Moreover, this thermocouple has a relatively high electrical and thermal non-conductivity. Data obtained from instrumentation of the thermocouple of the instant invention show rapid response to temperature changes, which property makes possible accurate and substantially instantaneous determination of relatively high temperatures above 2000° C.

It will be understood that modifications and variations may be effected without departing from the scope and novel concepts of the present invention.

This application is a continuation-in-part of our copending United States application, entitled "Carbon-Carbon Boron Thermocouple," Serial No. 506,241, filed May 5, 1955, now abandoned.

What is claimed is:

1. A thermocouple for measuring temperatures above 2000° C. wherein one of the elements thereof consists of a crystalline carbon article thermoelectrically modified by the inclusion as an essential constitutent therein of atoms of boron as impurities in said carbon, said boron being present in an amount between 0.1 percent and 5.0 percent by weight of said article, said boron being so disposed therein as to alter the thermoelectromotive force of said carbon article.

2. A crystalline carbon article containing as an essential constituent therein atoms of boron as impurities in said carbon, said boron being present in an amount between 0.1 percent and 5.0 percent by weight of said article, said boron being so disposed therein as to alter the thermoelectromotive force of said carbon articles from that of an identical carbon article having no atomic boron disposed therein.

3. A thermocouple for measuring temperatures above 2000° C. consisting essentially of a pair of refractory elements; one of said elements consisting of graphite and the other of said elements consisting of graphite thermoelectrically modified by the inclusion as an essential constituent therein of atoms of boron as impurities in said graphite, said boron being present in an amount between 0.1 percent and 5.0 percent by weight of said article, said boron being so disposed as to alter the thermoelectromotive force of said graphite article.

References Cited in the file of this patent

UNITED STATES PATENTS

| | | |
|---|---|---|
| 1,897,214 | Ridgway | Feb. 14, 1933 |
| 2,152,153 | Ridgway | Mar. 28, 1939 |

OTHER REFERENCES

Moeller, T.: "Inorganic Chemistry," John Wiley & Sons, New York, 1952, pp. 698–699, 662 and 668.

UNITED STATES PATENT OFFICE
CERTIFICATION OF CORRECTION

Patent No. 2,946,835                 July 26, 1960

Russell D. Westbrook et al.

It is hereby certified that error appears in the above numbered patent requiring correction and that the said Letters Patent should read as corrected below.

Column 3, line 12, for "openings" read -- opening --; column 4, lines 13 and 20, for "0.1", each occurrence, read -- 0.01 --; line 22, for "articles" read -- article --; same column 4, line 32, for "0.1" read -- 0.01 --.

Signed and sealed this 6th day of June 1961.

(SEAL)
Attest:

ERNEST W. SWIDER
Attesting Officer

DAVID L. LADD
Commissioner of Patents